(12) United States Patent
Akers, Jr. et al.

(10) Patent No.: US 7,354,962 B1
(45) Date of Patent: Apr. 8, 2008

(54) ENCAPSULATED PIGMENT FOR INK-JET INK FORMULATIONS AND METHODS OF PRODUCING SAME

(75) Inventors: Charles Edward Akers, Jr., Lexington, KY (US); Jing X. Sun, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 701 days.

(21) Appl. No.: 10/886,467

(22) Filed: Jul. 7, 2004

Related U.S. Application Data

(62) Division of application No. 10/161,910, filed on Jun. 4, 2002, now abandoned.

(51) Int. Cl.
C09D 11/00 (2006.01)
C09D 11/02 (2006.01)
C09D 11/08 (2006.01)

(52) U.S. Cl. .................. 523/160; 523/161; 523/200; 523/205; 524/558; 524/560

(58) Field of Classification Search ............. 523/160, 523/161, 200, 205; 524/558, 560; 106/31.13
See application file for complete search history.

(56) References Cited

U.S. PATENT DOCUMENTS

| | | | |
|---|---|---|---|
| 4,665,107 A * | 5/1987 | Micale ................... 523/105 |
| 5,085,698 A | 2/1992 | Ma et al. |
| 5,160,372 A | 11/1992 | Matrick |
| 5,656,071 A | 8/1997 | Kappele et al. |
| 5,714,538 A | 2/1998 | Beach et al. |
| 5,719,204 A | 2/1998 | Beach et al. |
| 5,852,074 A | 12/1998 | Tsutsumi et al. |
| 5,869,564 A | 2/1999 | Beach et al. |
| 5,891,231 A | 4/1999 | Gnerlich et al. |
| 5,954,866 A * | 9/1999 | Ohta et al. ............. 106/31.89 |
| 5,962,552 A | 10/1999 | Mikami et al. |
| 5,990,202 A | 11/1999 | Nguyen et al. |
| 6,011,098 A * | 1/2000 | Kashiwazaki et al. ...... 524/377 |
| 6,031,019 A | 2/2000 | Tsutsumi et al. |
| 6,031,024 A | 2/2000 | Uraki et al. |
| 6,034,153 A | 3/2000 | Tsang et al. |
| 6,051,628 A | 4/2000 | Bishop et al. |
| 6,057,384 A | 5/2000 | Nguyen et al. |
| 6,087,416 A | 7/2000 | Pearlstine et al. |
| 6,117,921 A | 9/2000 | Ma et al. |
| 6,147,139 A | 11/2000 | Shaw-Klein et al. |
| 6,174,357 B1 | 1/2001 | Kappele |
| 6,180,690 B1 | 1/2001 | Spinelli |
| 6,454,403 B1 * | 9/2002 | Takada et al. ............ 347/100 |
| 6,740,690 B2 * | 5/2004 | Nakano et al. ............ 523/160 |
| 2002/0147252 A1 * | 10/2002 | Adams ...................... 523/161 |
| 2003/0008942 A1 * | 1/2003 | Ninomiya et al. ......... 523/160 |
| 2003/0236321 A1 * | 12/2003 | Sano et al. ................ 523/160 |

* cited by examiner

Primary Examiner—Sanza L. McClendon
(74) Attorney, Agent, or Firm—Taylor & Aust, P.C.

(57) ABSTRACT

Encapsulated pigment for use in ink-jet ink formulations, improved ink-jet ink formulations using the encapsulated pigment, and methods for producing same. The pigment particles are pretreated with a polymer that is soluble in organic solvents, but substantially insoluble in water. The pigment particles are added to a solution of polymer/organic solvent, mixed to form a paste then collected after driving off the solvent. The encapsulated pigment can be used to prepare an ink-jet ink formulation by grinding it in a water carrier with a conventional polymer dispersant.

30 Claims, No Drawings

ENCAPSULATED PIGMENT FOR INK-JET INK FORMULATIONS AND METHODS OF PRODUCING SAME

This application is a division of prior application Ser. No. 10/161,910; filed Jun. 4, 2002 now abandoned.

BACKGROUND OF THE INVENTION

1. Field of the Invention

This invention relates to encapsulated pigment for use in ink-jet ink formulations, improved ink-jet ink formulations using the encapsulated pigment, and methods for producing same.

2. Description of Related Art

Ink-jet printing is a conventional technique by which printing is normally accomplished without contact between the printing apparatus and the medium on which the desired print characters are deposited. Such printing is accomplished by ejecting ink from an ink-jet printhead of the printing apparatus via numerous methods that employ, for example, pressurized nozzles, electrostatic fields, piezo-electric elements and/or heaters for vapor-phase bubble formation.

Ink compositions used in ink-jet printing typically employ water, colorants and low molecular weight water-soluble or water-miscible solvents. The colorants are generally selected from dyes and pigments. Dye-based inks, while in general superior in color properties, have several disadvantages as compared to pigment-based inks. For example, dyes are usually water-soluble and remain so after drying on the print medium, and thus are easily re-dissolved by water spills. In addition, dyes typically exhibit relatively poor light stability relative to pigments and are known to fade even under normal office lighting. Thus, dye-based inks are often unsuitable for use in applications requiring water resistance and light stability. Consequently, pigments are generally preferred colorants for ink-jet ink formulations.

Unfortunately, the use of pigments in ink-jet ink formulations is not problem free. For example, pigments are typically water insoluble and exist as discrete particles in the final ink formulation and have a tendency to aggregate. The insoluble pigment particles are typically stabilized as a dispersion by use of a polymer dispersant component having a hydrophobic segment and a hydrophilic segment. Generally speaking, most pigment inks stabilized with polymer dispersants in aqueous media are based on an electosteric stabilizing mechanism in which the hydrophobic segment of the dispersant acts as an anchor adsorbed onto the surface of the pigment particle through acid-base, electron donor/acceptor, Van der Waals forces, or physical absorption. In such a system, the hydrophilic segment of the dispersant is extended into the aqueous medium to keep the dispersant dispersed and to set up an electosteric layer to prevent aggregation of the pigment particles.

Many interrelated and competing forces are present in these complex pigmented ink formulations, consequently, it is extremely difficult to formulate a polymer dispersant system for pigmented ink-jet inks that simultaneously provide improved stability, water-fastness, light-fastness, smear resistance, highlighter resistance, minimized nozzle clogging and print density.

It is desirable to produce a final ink formulation having as many of these properties as possible, especially smear resistance and highlighter resistance. Conventional methods for producing pigment-based ink-jet inks using conventional polymer dispersants fall short since they typically have inferior film-forming properties. Pigment-to-dispersant ratio plays an important role in the film-forming property versus optical density. For example, a higher level of dispersant will typically improve smear resistance but at the expense of optical density. One conventional solution to this problem is to use a binder to improve film-forming properties, such as those taught in U.S. Pat. No. 6,063,834 which is incorporated herein by reference. Binders are typically very sensitive to heat and thus are not compatible with thermal ink-jet print heads. Therefore, the amount of binder that can be added to the ink is limited and thus, the ink does not produce high quality print.

Therefore, there still remains a need in the art for ink-jet ink formulations and manufacturing techniques that leads to print having improved properties.

SUMMARY OF THE INVENTION

In accordance with the present invention, there is provided encapsulated-pigment particles for use in ink-jet ink formulations, which pigment particles are at least partially encapsulated with one or more polymer materials, which polymer materials are at least partially soluble in an organic solvent, but substantially insoluble in water.

Also, in accordance with the present invention, there is provided a method for producing encapsulated pigment particles suitable for ink-jet ink formulations, which method comprising: a) at least partially dissolving an organic soluble polymer material in an organic solvent, thereby forming a solution; b) introducing an effective amount of pigment particles into the resulting polymer/solvent solution, thereby forming a slurry; c) mixing the slurry at effective conditions to form a paste; and d) drying off the solvent thereby leaving pigment particles that are at least partially encapsulated with the polymer material.

The paste of step c) can be subjected to a water wash and dried, but the preferred embodiment is to drive off the solvent when feasible.

Also in accordance with the present invention, there is provided ink-jet ink formulations comprising: a) an aqueous carrier; b) an effective amount of pigment particles that are at least partially encapsulated with a first polymer material, which first polymer material is at least partially soluble in organic solvent, but which is substantially insoluble in water; and c) a second polymer material that is a dispersant for the pigment and which is at least partially soluble or miscible in water.

In preferred embodiments of the present invention there is also present in the ink formulations at least one additive selected from the group consisting of driers, waxes, antioxidants, lubricants, surfactants, defoamers, wetting agents, biocides, chelators, and anti-curling agents.

Also in accordance with the present invention there is provided a method for preparing an ink-jet ink formulation comprising: a) at least partially dissolving an organic soluble first polymer material in an organic solvent, thereby resulting in a solution; b) introducing an effective amount of pigment particles into the resulting polymer/solvent solution thereby forming a slurry of pigment particles in the polymer/solvent solution; c) mixing the slurry at effective conditions to form a paste; d) drying off the solvent, thereby resulting in pigment particles that are at least partially encapsulated with the first polymer material; and e) grinding the encapsulated pigment particles with a water soluble or water miscible second polymer material that is a dispersant for the pigment for an effective amount of time to result in a final particle size from about 50 nm to 300 nm.

DETAILED DESCRIPTION OF THE INVENTION

This invention relates to improved pigment for ink-jet ink formulations and a method of producing them. A first polymer material is used to pre-treat the pigment particles before grinding them with conventional second polymer dispersant materials that are water-soluble or water miscible. The first polymer material, which is substantially insoluble in water, will be at least partially, preferably substantially totally, encapsulate the pigment particles. The ink formulations prepared with the encapsulated pigments of the present invention result in improved print that is substantially smear-free and highlighter resistant on suitable substrates, with improved print quality such as water-fastness and light-fastness.

There is no limitation with respect to the pigments that can be used in this invention, other than that they be suitable for use in ink-jet ink formulations. Any of the commonly employed organic and inorganic pigments can be used in the practice of the present invention. Non-limiting examples of pigments that can be used in the practice of the present invention include azo pigments such as condensed and chelate azo pigments; polycyclic pigments such as phthalocyanines, anthraquinones, quinacridones, thioindigoids, isoindolinones and quinophthalones. Still other pigments that can be employed include, for example, nitro pigments, daylight fluorescent pigments, carbonates, chromates, titanium oxides, zinc oxides, iron oxides and carbon black. A more complete list of such pigments can be found in U.S. Pat. No. 6,057,384, which is incorporated herein by reference. Such pigments can be prepared by any conventional technique and many of them are commercially available.

The pigment is pre-treated in accordance with the present invention by treating it with a first polymer material that is at least partially soluble in an organic solvent but substantially insoluble in water. It is preferred that an organic solvent be used in which the polymer is totally soluble at the concentrations needed to encapsulate the pigment particles. That is, wherein the polymer dissolves without any residual solids remaining. Conventional methods teach grinding pigment with a water-soluble polymer material dispersant without first pre-treating it with a water-insoluble polymer material. It is preferred that the first polymer material have: a) a relatively strong affinity for the second polymer material; b) film-forming ability; and c) a relatively strong affinity for the pigment. It is also preferred that the first polymer material be structurally similar to the second polymer material used to prepare the final ink formulation. The polymer materials used herein will also have a polar and a non-polar segment. It is more preferred that both polymer materials have a polar segment and a non-polar segment, which are often referred to as a hydrophilic segment and a hydrophobic segment. The average weight molecular weight is preferred from 1,000-15,000 more preferred is from 3,000-10,000, most preferred 5,000-8,000.

Non-limiting examples of preferred monomers that can contribute to the non-polar section of the first polymer material include: polydimethylsiloxane, propoxylated allyl methacrylate, nonylphenyl polypropylene gylcol acrylate, stearyl methacrylate, ethylene glycol, dicyclophentenyl ether methacrylate, alkyl(meth)acrylate, styrene, poly(ethylene glycol)2,4,6,-tris(1-phenylethyl)phenyl ether, 2-(2'hydroxy-5'-methacryloxyethyl-phenyl)-2H-benzotriazole and the like. More preferred are the alkyl(meth)acrylates, nonylphenyl polypropylene glycol, and 2-(2'hydroxy-5'-methacryloxyethyl-phenyl)-2H-benzotriazole. Most preferably are the alkyl(meth)acrylates, particularly n-butyl acrylate and methyl methacrylate styrene. Non-limiting examples of preferred monomers that can contribute to the polar section of the polymer material include: hydroxyethyl methacrylate, hydroxy terminated monomer, combined with or without acid-amine monomers and the like. More preferred is hydroxyethyl methacrylate. The ratio of pigment to first polymer material will be from about 10 to 1 to about 1 to 1, preferably from about 3 to 1 to about 1 to 1.

One preferred method of practicing the present invention is to encapsulate the pigment particles with a first polymer material by: a) dissolving a water-insoluble polymer material in a suitable organic solvent thereby resulting in a polymer/solvent solution; b) introducing an effective amount of pigment particles into the solution thereby resulting in a slurry of pigment particles in the polymer/solvent solution; c) mixing, or kneading the slurry for an effective amount of time and under effective conditions to form a paste; and d) driving, or drying, off the solvent and collecting the pigment particles that will be at least partially encapsulated with the first polymer material. It is preferred that the pigment particles be substantially totally encapsulated with the first polymer material.

It will be understood that after the mixing, or kneading step, the resulting paste can be washed with water and dried depending on whether or not the organic solvent is also used as a humectant in the final ink formulation. An alternative is to simply dry, or evaporate off, the solvent if a relatively low-boiling solvent is used, such as acetone or isopropyl alcohol. Further, a mixture of a high-boiling and a low-boiling solvents can be used in which case the low-boiling solvent can be dried off and the higher-boiling solvent left as a humectant for the final ink formulation. For example, if the solvent is not used as a humectant in the final ink formulation, or if the amount of solvent in the paste would exceed that called for in the final ink formulation, then it will be necessary to wash and dry the paste. If the solvent can also be used as a humectant in the final ink formulation, and if the amount of organic solvent does not exceed that required for the final ink formulation, then it is preferred not to wash and dry the paste.

The mixing of pigment particles and first polymer material can be accomplished in any suitable mixing device so long as the mixing is energetic enough to associate the polymer material with the pigment particles to result in at least a partial encapsulation of the pigment particles. It is preferred that substantially all of the pigment particles be substantially entirely encapsulated with the polymer material.

The selected pigment can be used in dry or wet form, with a dry-powder form being preferred. Pigments are usually manufactured in an aqueous media and the resulting pigment is often obtained as water-wet presscake. Thus, pigments in water-wet presscake form typically do not require much deflocculation in the process of preparing the inks as dry pigments.

Once the pigment particles have been encapsulated with the polymer material there is no limitation with respect to the method used to prepare the ink formulations. Essentially, the components (e.g., encapsulated pigment, additive, polymer dispersant, and water carrier) of the inks can, for example, be mixed, stirred or agitated using any conventional technique to reduce the size of the pigment particles. This is generally accomplished by use of grinding mill used to produce the particle size of about 50 nm to 300 nm, preferably to less than about 200 nm, and more preferably to less than about 140 nm. This particle size is achieved by extensive shearing of the pigment particles using small grinding media. Typical of the grinding media includes spherical particles made from suitable materials, such as stainless steel, zirconium silicate, zirconium oxide and glass. Preferred grinding media are spherical ceramic particles having a smooth and substantially uniform exterior surface, a high density and high hardness. A particularly preferred grinding medium is a material commercially available under the name YTZ Ceramic Beads, commercially available from S. E. Firestone Associates. This material is in the form of spherical ceramic particles having a core of a high purity zirconium oxide treated with yttrium to make the spheres highly wear resistant. Grinding times will typically be from about 7 to 12 hours and solids content in grinding will be about 20 wt. %, which will be lowered to about 12 to 15 wt. % with deionized water, after grinding.

It is preferred to grind the components in a suitable grinding device such as an attritor using suitable grinding media, such as conventional grinding beads. The addition of the components is not limited to any particular order so long as the resulting ink formulation is one that can be satisfactorily used to produce print on a suitable substrate.

The second polymer material can act as both the wetting agent and the dispersant that stabilizes the pigment particles and prevents them from agglomerating. There is essentially no limitation with respect to the dispersants that can be used in this invention. In fact, any non-polymer or polymer dispersant that can be used to make a pigment-based ink formulation can be used in this invention. The preferred dispersants are polymer dispersants. An illustrative list of such polymer dispersants include random, block and branched polymers, whereby the polymers can be anionic, cationic or nonionic in nature. The polymer dispersants typically have polar segments for aqueous solubility and non-polar segments for pigment interaction. Moreover, polymer dispersants, as used herein, are meant to include water-soluble homopolymers and copolymers (including terpolymers).

Since the second polymer material used in this invention are generally limited only to the extent that they are capable of dispersing a colorant (pigment) in an aqueous-based ink formulation, the precursor units that can be used to make such polymer dispersants are not limited. Precursor, as used herein, is meant to include monomeric and macromeric units.

A general list of the monomeric units that can be employed to make such second polymer dispersant materials include, for example, acrylic monomers, styrene monomers and monomers having acid/amine groups. Illustrative examples of the monomers that can be employed include acrylic and methacrylic acid, acrylamide and methacrylamide. Such polymer dispersants tend to be any of those that are commercially available as well as the polymer dispersants that can be made via conventional techniques that include, for example, condensation and addition polymerizations such as anionic, group transfer or free radical polymerizations of monomeric units.

The preferred polymer dispersants that can be employed in this invention as the second polymer material are random terpolymers prepared from three precursors. The most preferred precursors include monomeric and macromeric precursors, including at least one member selected from the group consisting of acrylates and methacrylates, at least one member selected from the group consisting of acryloyl- and methacryloyl-terminated polydiakylsiloxanes and at least one member selected from the group consisting of stearyl acrylate, stearyl (meth)acrylate, nonyl phenyl(polypropylene glycol)methacrylate, and lauryl methacrylate. A more preferred polymer dispersant used herein is referred to as Lexmark™ acrylic terpolymer and is made from polymerizing methacrylic acid, stearyl methacrylate, and dimethylsiloxane.

The polymer dispersants prepared from these particularly preferred precursors can be made by polymerizing the monomeric and macromeric precursors via art-recognized techniques that include free radical polymerizations. A more detailed description of the most preferred polymer dispersants that can be employed in this invention can be found in U.S. Pat. Nos. 5,719,204 and 6,225,370, the disclosures of which are incorporated herein by reference. Generally, free radical polymerization used to prepare the polymer dispersants utilize initiators and chain transfer agents to control the polymer molecular weight. Any conventional free radical initiator can be used in the present invention as long as they are compatible with the reactants being utilized. Suitable free radical initiators include the azo-type and peroxide-type initiators. Preferred initiators are the azo-type. Preferred initiators include dimethyl 2,2'-azobisisobutyrate (V-601™), AIBN™ and V-501™ from the Wako Company.

Other additives can be added to the ink formulation. Non-limiting examples of such additives include driers, waxes, antioxidants, lubricants, surfactants, gallants, defoamers, wetting agents, biocides, chelators, and anti-curling agents.

The surfactants can be anionic, cationic, or amphoteric non-ionic surfactants. Non-limiting examples of suitable anionic surfactants include fatty acid salt, alkyl sulfate, alkylaryl sulfonate, alkylnaphthalene sulfonate, dialkyl sulfonate, dialkyl sulphosuccinate, alkyl diaryl ether disulfonate, alkyl phosphate, polyoxyethylene alkyl ether sulfate, polyoxyethylene alkylaryl ether sulfate, naphthalene sulfonate-formalin condensate, polyoxyethylene alkyl phosphate, glycerol borate fatty acid ester and polyoxyethylene glycerol fatty acid ester.

Non-limiting examples of suitable the nonionic surfactants include polyoxyethylene alkyl ether, polyoxyethylene alkylaryl ether, polyoxyethylene oxypropylene block copolymer, sorbitan fatty acid ester, polyoxyethylene sorbitan fatty acid ester, polyoxyethylene sorbitol fatty acid ester, glycerin fatty acid ester, polyoxyethylene fatty acid ester polyoxyethylene alkylamine, a fluorine-containing nonionic surfactant and a silicon-containing nonionic surfactant.

Non-limiting examples of suitable the cationic surfactants include alkylamine salt, ammonium salt, alkylpyridinium salt and alkylimidazolium salt. Examples of the amphoteric surfactants include alkylbetaine, alkylamine oxide and phosphatidylcholine.

The aqueous carrier used for the ink formulations of the present invention is comprised of water or a mixture of water and at least one water-soluble organic solvent. Selection of a suitable mixture depends on requirements of the specific application, such as desired surface tension and viscosity, the selected pigment, drying time of the pigmented ink jet-ink, and the type of paper onto which the ink will be printed. Representative examples of water-soluble organic solvents that can be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol mono-methyl (or -ethyl)ether, diethylene glycol mono-methyl (or -ethyl)ether, propylene glycol mono-methyl (or -ethyl)ether, triethylene glycol mono-methyl (or -ethyl)ether and diethylene glycol di-methyl (or -ethyl)ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

The ink-jet ink formulations of the present invention can contain 0.05 to 1.0% by weight, based on the ink formulation, of a biocide for preventing the occurrence of biological growth.

A pH adjuster such as an amine, an inorganic salt or ammonia and a buffer solution such as phosphoric acid can be used for adjusting the pH of the ink formulation, stabilizing the ink and stabilizing an ink-tubing in a recording device.

Further, the ink formulations of the present invention can contain an anti-foaming agent for preventing the occurrence of foams when the ink is circulated, moved or produced.

The following examples serve to exemplify a more general description set forth above and are for illustrative purposes only and are not intended to limit the scope of the present invention in any way.

EXAMPLE 1

Preparation of the Water Insoluble Polymer-A (WIPA)

The following ingredients were weighed into a round bottom flask:

| | |
|---|---|
| 2-Hydroxyethyl Methacrylate | 24.38 g |
| n-Butyl Acrylate | 40.00 g |
| Methyl Methacrylate | 12.50 g |
| Dodecanethiol | 3.79 g |
| Isopropyl Alcohol | 200 mL |
| V-601 azo Initiator | 0.71 g |

The flask was equipped with a condenser, a thermometer and a mechanical stirrer. The flask was evacuated and then back-filled with nitrogen. The reaction mixture was then heated using an oil bath to 75° C. and maintained at that temperature for 18 hours. The reaction mixture was then cooled to room temperature (about 24° C.) and transferred to a bottle. The weight average molecular weight (MW) was 6813 and the percent solids was about 35%.

The Water Soluble Polymer-A (WSPA)

The water-soluble polymer used for this example contained the following monomer set at a molar ratio of 9:1:1 respectively, all the water soluble polymers may be prepared by the method described in U.S. Pat. No. 5,714,538 to Beach et al. (incorporated herein by this reference).

Methacrylic Acid

Poly(ethylene glycol) 2,4,6-tris (1-phenyl ethyl)phenyl ether methacrylate (60%)
Polydimethyl Siloxane Methacrylate Encapsulation of Pigment (PA)

The following ingredients were weighed into a beaker:

| | |
|---|---|
| Self Dispersing Carbon Black (CB) - (oxidized with sodium hypochlorite) | 15.0 g |
| Water Insoluble Polymer-A (still in IPA solution) | 15.0 g (polymer only) |

The ingredients were thoroughly mixed until substantially all of the pigment was wetted. The wetted ingredients were then placed in an oven at 85° C. for 18 hour whereupon they were removed and placed in a bottle until ready for use.

Encapsulation of Pigment (PB)

The procedure for preparing pigment PA was followed except 15.5 g of Monarch 880 pigment was used instead of the self-dispersing carbon black and 15.5 g of water insoluble polymer (WIPA) was used.

Method for Dispersing Encapsulated Pigment

The following ingredients were weighed into an attritor cup:

| | |
|---|---|
| Encapsulated Monarch 880 (PB) | 31.00 g |
| Water Soluble Polymer-A (based on 15% solution) | 33.33 g |
| Poly(ethylene glycol) 400 | 30.00 g |
| Deionized Water | 85.67 g |

The ingredients were ground for 16 hours after which the resulting dispersion was separated from the grinding media using a sieve. The dispersion, having an average particle size of 295 nm, was stored in a bottle for use in an ink formulation.

The above procedure for dispersing the encapsulated pigment was used except the ingredients weighed into an attritor cup were:

| | |
|---|---|
| Encapsulated Self Dispersing CB (PA) | 30.00 g |
| Water Soluble Polymer-A (based on 15% solution) | 40.00 g |
| Poly(ethylene glycol) 400 | 30.00 g |
| Deionized Water | 80.00 g |

A control ink formulation and an encapsulated pigment ink formulation were prepared as set forth in the Table 1 below. All percents are by weight based on the total weight of the ink formulation.

TABLE 1

| Control: | Encapsulated Pigment Formulation |
|---|---|
| 2% pigment Monarch 880 dispersion | 2% pigment encapsulated M880 |
| 2% pigment self-dispersed carbon black | 2% pigment encapsulated self dispersed carbon black |
| 7.5% Polyethylene Glycol 400 | 7.5% Polyethylene Glycol 400 |
| 7.5% 2-Pyrrolidone | 7.5% 2-Pyrrolidone |
| 1.2% 1,2-Hexanediol | 1.2% 1,2-Hexanediol |

TABLE 1-continued

| Control: | Encapsulated Pigment Formulation |
|---|---|
| 0.4% Hexylcarbitol | 0.4% Hexycarbitol |
| 0.5-2.5% Binder | |
| Balance deionized water | Balance deionized water |

Each ink formulation was filtered and filled into ink-jet printheads for print testing. Table 2 below shows the results obtained for highligther smear. "+" means better than the control, "=" means equal to the control, and "−" means not as good as the control.

TABLE 2

| Control | Encapsulated Pigment |
|---|---|
| No Binder | + |
| 0.5% Binder | + |
| 1.0% Binder | + |
| 2.5% Binder | nearly = |

EXAMPLE 2

Preparation of Water Insoluble Polymer-B

The following ingredients were weighed into a round bottom flask:

| 2-Hydroxyethyl Methacrylate | 37.70 g |
|---|---|
| PolyDimethyl Siloxane(1000 Mw) | 1.13 g |
| Stearyl Methacrylate | 12.50 g |
| Dodecanethiol | 8.81 g |
| Isopropyl Alcohol | 100 mL |
| V-601 Azo Initiator | 0.76 g |

The flask was equipped with a condenser, a thermometer and a mechanical stirrer. The flask was evacuated and then back-filled with nitrogen. The reaction mixture was then heated with an oil bath to 75° C. and maintained at that temperature for 18 hours. The reaction mixture was then cooled to room temperature and transferred to a bottle. The weight average as 5464 and the percent solids was about 40%.

Example 1 was then followed using the same pigments, encapsulation procedures, ink formulations, and testing of the ink formulations. The results are set forth in Table 3 below.

TABLE 3

| Control | Encapsulated Pigment |
|---|---|
| No Binder | + |
| 0.5 wt. % Binder | + |
| 1.0 wt. % Binder | = |
| 2.5 wt. % Binder | − |

EXAMPLE 3

Preparation of Water Insoluble Polymer-C

The following ingredients were weighed into a round bottom flask:

| 2-Hydroxyethyl Methacrylate | 37.70 g |
|---|---|
| Poly(propylene glycol) 4-noniylphenyl ether Acrylate | 15.19 g |
| Poly(Dimethyl Siloxane(1000 Mw) | 31.13 g |
| Dodecanethiol | 8.91 |
| glsopropyl Alcohol | 125 mL |
| V-601 Azo Initiator | 0.82 g |

The flask was equipped with a condenser, a thermometer, and a mechanical stirrer. The flask was evacuated and then back-filled with nitrogen. The reaction mixture was then heated using an oil bath to 75° C. and maintained at that temperature for 18 hours. The reaction mixture was then cooled to room temperature and transferred to a bottle. The weight average molecular weight was 5084 and the percent solids was about 40%.

Water Soluble Polymer-B:

The water-soluble polymer (B) used for this example was comprised of the following monomer set at the molar ratio 8:1:1 respectively.

Methacrylic Acid
Poly(propylene glycol) 4-nonylphenyl ether acrylate
Polydimethyl Siloxane Methacrylate Encapsulation of the Pigment C:

The following ingredients were weighed into a beaker:

| Pigment Blue 15:3 | 15.0 g |
|---|---|
| Water insoluble polymer (still in IPA solution) | 15.0 g (polymer only) |

The ingredients were thoroughly mixed until substantially all pigment was wetted. The resulting mixture was placed in oven at 85° C. for 18 hours, then removed and placed in a bottle until ready for use.

Method of Dispersing Encapsulated Pigments:

The following ingredients were weighed into an attritor cup:

| Encapsulated Pigment Blue 15:3 | 30.00 g |
|---|---|
| Water Soluble Polymer (based on 15% solution) | 40.00 g |
| Poly(ethylene glycol) 400 | 30.00 g |
| DI Water | 80.00 g |

The ingredients were ground for 16 hours, after which the resulting dispersion was separated from the grinding media using a sieve. The resulting dispersion was stored in a bottle for use in an ink formulation.

A control ink formulation and an encapsulated pigment blue ink formulation were prepared as set forth in Table 4 below. All percents are by weight based on the total weight of the ink formulations.

TABLE 4

| Control: | Encapsulated Pigment Formulation |
|---|---|
| 2% pigment Monarch 880 dispersion | 2% encapsulated Pigment Blue 15:3 |
| 2% pigment self-dispersed carbon black | 2% encapsulated self dispersed carbon black pigment (PA) |
| 7.5% Polyethylene Glycol 400 | 7.5% Polyethylene Glycol 400 |
| 7.5% 2-Pyrrolidone | 7.5% 2-Pyrrolidone |
| 1.2% 1,2-Hexanediol | 1.2% 1,2-Hexanediol |
| 0.4% Hexylcarbitol | 0.4% Hexycarbitol |
| 0.5-2.5% Binder | |
| Balance deionized water | Balance deionized water |

The inks were then filtered and filled in ink-jet printheads for print testing. The results for the hi-liter smear test are set forth in Table 5 below.

TABLE 5

| Control | Encapsulated Pigment |
|---|---|
| No Binder | + |
| 0.5 wt. % Binder | + |
| 1.0 wt. % Binder | = |
| 2.5 wt. % Binder | − |

EXAMPLE 4

Preparation of the Water Insoluble Polymer-D

The following ingredients were weighed into a round bottom flask:

| | |
|---|---|
| 2.Hydroxyethyl Methacrylate | 8.00 g |
| Sipomer SEM-251 from Rhodia | 80.00 g |
| Norbloc 7966 (Jansen) | 15.00 g |
| Dodecanethiol | 3.50 g |
| Isopropyl Alcohol | 50 mL |
| Tetrahydrofuran | 50 mL |
| V.601 Azo Initiator | 0.30 g |

1 Sipomer SEM-25 is poly(ethylene glycol)2,4,6-tris(1-phenylethyl)phenyl ether.
2 Norbloc 7966 is 2-(2'Hydroxy-5'-methacryloxyethylphenyl)-2H-benzotriazole.

The flask was equipped with a condenser, a thermometer and a mechanical stirrer. The flask was evacuated, then back-filled with nitrogen. The reaction mixture was then heated using an oil bath to 75° C. and maintained at that temperature for 18 hours. The reaction mixture was then cooled to room temperature and transferred to a bottle. The weight average molecular weight was 8535 and the percent solids was about 40%.

Example 1 was then followed using the same pigments, encapsulation procedures, ink formulations, and testing of the ink formulations. The results are set forth in Table 6 below.

TABLE 6

| Control | Encapsulated Pigment |
|---|---|
| No Binder | + |
| 0.5 wt. % Binder | + |

TABLE 6-continued

| Control | Encapsulated Pigment |
|---|---|
| 1.0 wt. % Binder | = |
| 2.5 wt. % Binder | − |

EXAMPLE 5

Preparation Of Water Insoluble Polymer E

| | |
|---|---|
| 2-Hydroxyethyl Methacrylate | 35.19 g |
| Styrene | 30.00 g |
| Butyl Acrylate | 8.50 g |
| Dodecanethiol | 3.56 g |
| Isopropyl Alcohol | 200 ml |
| V-601 | 0.71 |

Preparation method is the same as WIPA and the product has an average weight molecular weight 6000 and 37% solid.

Preparation of Water Soluble Polymer C

This polymer contains the following monomer set, at molar ratio 15:1:1 respectively.

Methacrylate Acid

Poly(propyl ene glycol)4-nonylphenyl ether acrylate

Poly(ethylene glycol) 2,4,6,-tris (1-phenylethyl)phenyl ether methacrylate

Encapsulation of the Pigment:

| | |
|---|---|
| Polymer E | 13.8 g |
| Pigment yellow 74 | 18.0 g |
| Diethylene glycol | 8.0 g |

The ingredients were mixered together and dried off the IPA in oven.

Method of Dispersing Encapsulated Pigment

Encapsulated Pigment Yellow 74

51.8 g of polymer C (based on 12.08% aqueous solution 60 g of DI water)

Grinding for 12 hours and the final particle size is 191 nm

The control experiment used the same method without add polymer.

Ink is made from the above concentrate in the following formulation:

| | |
|---|---|
| Pigment | 3% |
| 2-pyrrolindone | 5% |
| PEG 1000 | 5% |
| Thiodiethanol | 5% |
| 1,2 Hexanediol | 1% |
| Balance water | |

Lightfastness of the ink is tested on Kodak Premium Photo Paper. Sample of the prints are faded for a week with Xenon arc lamp. Humidity was not controlled.

TABLE 7

|  | DeltaE @ OD = 1 | % change in OD |
|---|---|---|
| Control | 37.4 | 50% |
| Example 5 | 14.3 | 19% |

What is claimed is:

1. Encapsulated pigment particles for use in ink-jet ink formulations, which pigment particles are at least partially encapsulated with one or more polymer materials, wherein the weight ratio of said pigment particles to said polymer materials is from about 3 to 1 to about 1 to 1, wherein said polymer materials are at least partially soluble in an organic solvent, but insoluble in water, and which polymer materials have at least one polar segment having a hydroxyl group and at least one non-polar segment.

2. The encapsulated pigment particles of claim 1 wherein the monomer contributing to the non-polar segment of the polymer material is selected from the group consisting of polydimethylsiloxane, propoxylated allyl methacrylate, nonylphenyl polypropylene glycol acrylate, stearyl methacrylate, ethylene glycol ether methacrylate and alkyl(meth)acrylates.

3. The encapsulated pigment particles of claim 1 wherein the monomer contributing to the polar segment of the polymer material is selected from the group consisting of hydroxyethyl methacrylate and hydroxy terminated monomer, combined with or without acid-amine monomers.

4. The encapsulated pigment particles of claim 1 wherein the pigment particles are substantially totally encapsulated with said polymer material.

5. The encapsulated pigment particles of claim 2 wherein the monomer contributing to the polar segment of the polymer material is selected from the group consisting of hydroxyethyl methacrylate and a hydroxy terminated monomer, combined with or without acid-amine monomers, and the encapsulated pigment particles are totally encapsulated with said polymer material.

6. The encapsulated pigment particles of claim 1 wherein the monomer contributing to the non-polar segment is selected from the alkyl(meth)acrylates, nonylphenyl polypropylene glycol, and 2-(2'hydroxy-5'-methacryloxyethylphenyl)-2H-benzotriazole.

7. The encapsulated pigment particles of claim 6 wherein the monomer contributing to the polar segment is hydroxyethyl methacrylate.

8. A method for producing encapsulated pigment particles suitable for ink-jet ink formulations, which method comprising: a) dissolving an organic soluble polymer material in an organic solvent, which polymer material is comprised of at least one polar segment having a hydroxyl group and at least one non-polar segment; b) introducing an effective amount of pigment particles into the resulting polymer/solvent solution, thereby forming a slurry; and c) mixing the slurry at effective conditions to form a paste containing at least partially encapsulated pigment particles, wherein the weight ratio of said pigment particles to said polymer material is from about 3 to 1 to about 1 to 1 and wherein said polymer material is insoluble in water.

9. The method of claim 8 wherein the monomer contributing to the non-polar segment of said polymer material is selected from the group consisting of polydimethylsiloxane, propoxylated allyl methacrylate, nonylphenyl ppg acrylate, stearyl methacrylate, ethylene glycol ether methacrylate and alkyl(meth)acrylates.

10. The method of claim 8 wherein the monomer contributing to the polar segment of said polymer material is selected from the group consisting of hydroxyethyl methacrylate, hydroxy terminated monomer, combined with or without acid-amine monomers.

11. The method of claim 8 wherein the organic solvent is selected from the group consisting of acetone, isopropyl alcohol, ethylene glycol, pyrrolidane and propylene glycol.

12. The method of claim 8 wherein the paste of step c) is washed with water and dried.

13. The method of claim 8 wherein the organic solvent is also used as a humectant in a final ink formulation and thus is not driven off.

14. The method of claim 8 wherein the monomer contributing to the non-polar segment is selected from the alkyl(meth)acrylates, nonylphenyl polypropylene glycol, and 2-(2'hydroxy-5'-methacryloxyethyl-phenyl)-2H-benzotriazole.

15. The method of claim 14 wherein the monomer contributing to the polar segment is hydroxyethyl methacrylate.

16. The method of claim 14 wherein the monomer contributing to the non-polar segment is an alkyl(meth)acrylate.

17. The method of claim 16 wherein the alkyl(meth) acrylate is selected from n-butyl acrylate and methyl methacrylate.

18. The method of claim 14 wherein the monomer contributing to the polar segment of said polymer material is selected from the group consisting of hydroxyethyl methacrylate and a hydroxy terminated monomer, combined with or without acid-amine monomers; and ii) the organic solvent is selected from the group consisting of acetone, isopropyl alcohol, ethylene glycol, pyrrolidane and propylene glycol.

19. The method of claim 18 wherein the organic solvent is also used as a humectant in a final ink formulation and thus is not driven off.

20. The method of claim 18 wherein the paste of step c) is washed with water and dried.

21. A method for preparing an ink-jet ink formulation comprising: a) dissolving an organic soluble first polymer material in an organic solvent, which first polymer material contains at least one polar segment having a hydroxyl group and at least one non-polar segment; b) introducing an effective amount of pigment particles into the resulting polymer/solvent solution thereby forming a slurry of pigment particles in the polymer/solvent solution; c) mixing the slurry at effective conditions to form a paste; d) driving off at least a portion of the solvent, thereby resulting in pigment particles that are at least partially encapsulated with the first polymer material, wherein the weight ratio of said pigment particles to said first polymer material is from about 3 to 1 to about 1 to 1; and e) grinding the encapsulated pigment particles in a water carrier with a water soluble or water miscible second polymer material for an effective amount of time to result in a final particle size from about 100 to 300 nm, which second polymer material is comprised of a polar segment and a non-polar segment and which second polymer material is a dispersant with respect to the pigment particles.

22. The method of claim 21 wherein the monomer contributing to the non-polar segment of said first polymer material is selected from the group consisting of polydimethylsiloxane, propoxylated allyl methacrylate, nonylphenyl ppg acrylate, stearyl methacrylate, ethylene glycol ether methacrylate and alkyl(meth)acrylate.

23. The method of claim 21 wherein the monomer contributing to the polar segment of said first polymer material is selected from the group consisting of hydroxyethyl methacrylate and hydroxy terminated monomer, combined with or without acid-amine monomers.

24. The method of claim 22 wherein the monomer contributing to the non-polar segment of said first polymer material is an alkyl(meth)acrylate.

25. The method of claim 24 wherein the alkyl(meth) acrylate is selected from n-butyl acrylate and methyl methacrylate.

26. The method of claim 21 wherein the organic solvent is selected from the group consisting of acetone, isopropyl alcohol, ethylene glycol, 2-pyrrolidone and propylene glycol.

27. The method of claim 21 wherein the paste of step c) is washed with water and dried.

28. The method of claim 21 wherein: i) the monomer contributing to the polar segment of said first polymer material is selected from the group consisting of hydroxyethyl methacrylate and hydroxy terminated monomer, combined with or without acid-amine monomers; and ii) the organic solvent is selected from the group consisting of acetone, isopropyl alcohol, ethylene glycol, 2-pyrrolidone and propylene glycol.

29. The method of claim 28 wherein the monomer contributing to the non-polar segment of said first polymer material is an alkyl(meth)acrylate.

30. The method of claim 29 wherein the paste of step c) is washed with water and dried.

* * * * *